(12) United States Patent
Kim

(10) Patent No.: US 11,947,203 B1
(45) Date of Patent: Apr. 2, 2024

(54) LIQUID CRYSTAL DISPLAY DEVICE

(71) Applicant: LG Display Co., Ltd., Seoul (KR)

(72) Inventor: SungHee Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/355,668

(22) Filed: Jul. 20, 2023

(30) Foreign Application Priority Data

Dec. 27, 2022 (KR) ........................ 10-2022-0186027

(51) Int. Cl.
*G02F 1/13* (2006.01)
*G02F 1/1335* (2006.01)

(52) U.S. Cl.
CPC ...... *G02F 1/1323* (2013.01); *G02F 1/133626* (2021.01)

(58) Field of Classification Search
CPC ................................................ G02F 1/133626
USPC ....................................................... 349/61–68
See application file for complete search history.

(56) References Cited

U.S. PATENT DOCUMENTS

2023/0296821 A1\* 9/2023 Yagi ..................... G02B 6/0068
362/607

FOREIGN PATENT DOCUMENTS

KR 10-2017-0049747 A 5/2017

\* cited by examiner

*Primary Examiner* — Charles S Chang
(74) *Attorney, Agent, or Firm* — Seed IP Law Group LLP

(57) ABSTRACT

A display device includes a first backlight, a viewing angle control assembly disposed on the first backlight, a second backlight disposed on the viewing angle control assembly, and a display panel disposed on the second backlight. In a security mode, only the first backlight may be operable with the viewing angle control assembly having light blocking areas that limit light transmission to the display panel to within a predetermined range to limit a viewing angle of images displayed on the display panel. In a sharing mode, the second backlight is operated and the viewing angle control assembly does not limit light transmission, thus widening the viewing angle of images on the display panel. The display device may also include an anti-condensation layer on the second backlight to improve durability in high temperature and high humidity environments.

17 Claims, 7 Drawing Sheets

LIQUID CRYSTAL DISPLAY DEVICE

CROSS-REFERENCE TO RELATED APPLICATIONS

This application claims the benefit of and priority to Korean Patent Application No. 10-2022-0186027 filed on Dec. 27, 2022 in the Republic of Korea, the entire contents of which are hereby expressly incorporated by reference into the present application.

BACKGROUND

Technical Field

The present disclosure relates to a liquid crystal display device, and more specifically, but not exclusively, relates to a liquid crystal display device having excellent durability in a high temperature, high humidity environment.

Description of the Related Art

Liquid crystal displays (LCDs) are generally known and display an image by controlling light transmittance of liquid crystals using an electric field. Since the liquid crystal display device is not a self-luminous display device, a backlight unit is included to provide light to a liquid crystal display panel on which an image is displayed.

A light emitting diode (LED) is a common example of a light source for the backlight unit.

Examples of the backlight unit may be largely classified into a direct light type that irradiates light from a plurality of light sources installed directly below a liquid crystal display to a liquid crystal panel, and an edge light type that transmits light from a plurality of light sources installed on a sidewall of a light guide panel to a liquid crystal panel.

Known LCDs have a number of disadvantages and drawbacks. For example, various components of known LCDs are vulnerable to heat or moisture, including the backlight unit and its peripheral components. As a result, these components may be damaged or degraded in performance in a high temperature and high humidity environment.

Further, LCDs may be distracting in certain environments, such as in a vehicle. An image implemented by such a liquid crystal display device may distract the eyes of a person around a user, for example, a driver, leading to safety concerns. Accordingly, it would be advantageous to have an LCD that overcomes the deficiencies and disadvantages of known LCDs.

BRIEF SUMMARY

In one or more embodiments of the present disclosure, a liquid crystal display device is provided that is capable of implementing a security mode and a sharing mode by limiting a viewing angle according to a user's selection.

In one or more embodiments of the present disclosure, a liquid crystal display device is provided that is capable of suppressing degradation in display performance by suppressing a condensation phenomenon caused by moisture between a first backlight unit and a second backlight unit.

In one or more embodiments of the present disclosure, a liquid crystal display device is provided with improved durability in a high temperature, high humidity environment.

According to one or more embodiments of the present disclosure, a condensation phenomenon caused by heat generated from two backlight units can be suppressed by forming an anti-condensation layer coated with a hydrophilic material on a rear surface of the second light guide plate constituting the second backlight unit.

In some embodiments, the LCDs described herein have a wide range of applications due to features such as light weight, slimness, and low power consumption driving. The liquid crystal display devices may display a desired image on a screen by controlling the transmission amount of light according to image signals applied to liquid crystals arranged in a matrix shape and a plurality of control switches.

In some embodiments, an LCD is provided with a viewing angle that may be selectively limited in order to prevent an accident due to distraction of the eyes of the person around the user. For example, in order to limit the viewing angle, a liquid crystal display device including a first backlight unit, a second backlight unit, and a viewing angle control unit can be used.

Embodiments of the present disclosure are not limited to the above-mentioned embodiments, and other embodiments, which are not mentioned above, can be clearly understood by those skilled in the art from the following description.

Other detailed matters of the embodiments are included in the detailed description and the drawings.

The benefits and advantages according to the present disclosure are not limited to the contents exemplified above, and more various benefits and advantages are described with reference to the present specification.

DETAILED DESCRIPTION

Figure 1:
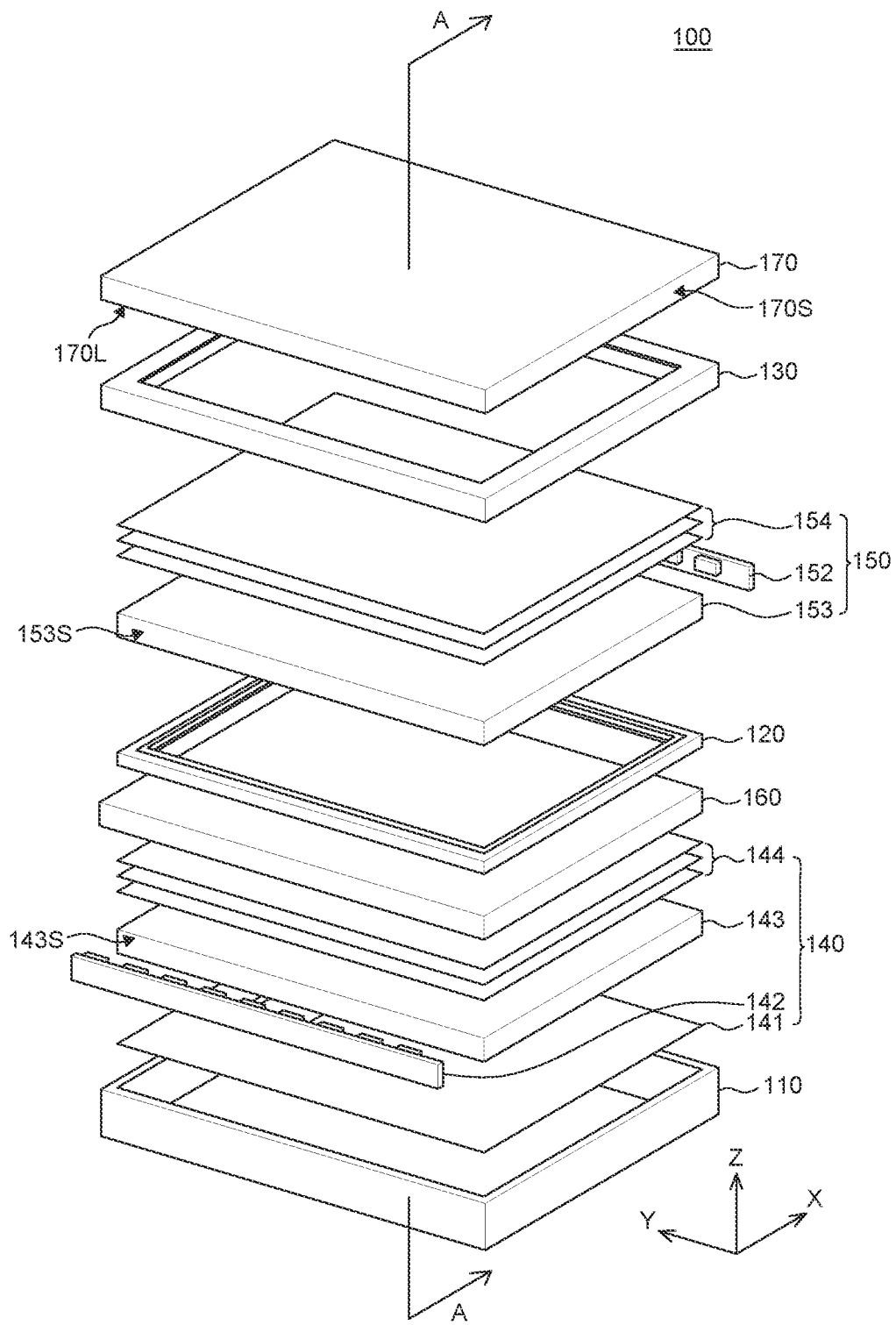
FIG. 1 is a schematic exploded perspective view of one or more embodiments of a liquid crystal display device according to the present disclosure.

Advantages and characteristics of the present disclosure and a method of achieving the advantages and characteristics will be clear by referring to the embodiments described below in detail together with the accompanying drawings. However, the present disclosure is not limited to the embodiments disclosed herein but will be implemented in various forms. The embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on," "above," "below," and "next," one or more parts may be positioned between the two parts unless the terms are used with the term "immediately" or "directly."

When an element or layer is disposed "on" another element or layer, another layer or another element may be interposed directly on the other element or therebetween.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

A size and a thickness of each component illustrated in the drawing may be illustrated for convenience of description, and the present disclosure is not limited to the size and the thickness of the component illustrated unless the context dictates otherwise.

The features of various embodiments of the present disclosure can be partially or entirely adhered to or combined with each other and can be interlocked and operated in technically various ways, and the embodiments can be carried out independently of or in association with each other.

Unless the context clearly dictates otherwise, a "security mode" may refer to a narrow viewing angle mode of an LCD for displaying an image at a narrow viewing angle such that the displayed image can be viewed by a user from an angle within a certain, comparatively narrow range. The term "security mode" is broad term that also includes private mode, privacy mode, single viewer mode, limited viewer mode, limited viewing angle mode and other terms having similar meanings. Thus, it is can be referred to by any of those names and terms. In the security mode, sufficient light transmittance can be satisfied within a specific viewing angle, while the light transmittance is very low in a side outside the specific viewing angle and thus, the displayed image cannot be recognized. In other words, when a user is facing a display panel of an LCD that displays an image in security mode in some embodiments of the disclosure, there will be sufficient light transmittance for the user to view the image on the display panel within a relatively narrow range of angles relative to the display panel, as described below. If the user moves to an angle outside of the narrow range of angles, or for another person positioned outside of the range of angles, there is minimal light transmittance such that the display image is difficult to recognize.

Unless the context clearly dictates otherwise, a "sharing mode" may refer to a comparatively wide viewing angle mode of an LCD for displaying an image at a wide viewing angle such that the displayed image can be viewed by users at a wider range of angles relative to the LCD, including the intended user and others nearby. In the sharing mode, sufficient light transmittance can be satisfied even at a wider viewing angle compared to the security mode, so that an image can be recognized even at a viewing angle at which the image cannot be recognized in the security mode. In other words, when a user is facing a display panel of an LCD that displays an image in sharing mode in some embodiments of the disclosure, there will be sufficient light transmittance for the user to view the image on the display panel within a relatively broad range of angles relative to the display panel, as further described below. The broad range of angles may also enable others nearby the user to view the image on the display panel.

Hereinafter, the present disclosure will be described in more detail with reference to the drawings.

FIGS. 1 and 2 are views for explaining a liquid crystal display device according to one or more embodiments of the present disclosure.

Figure 2A:
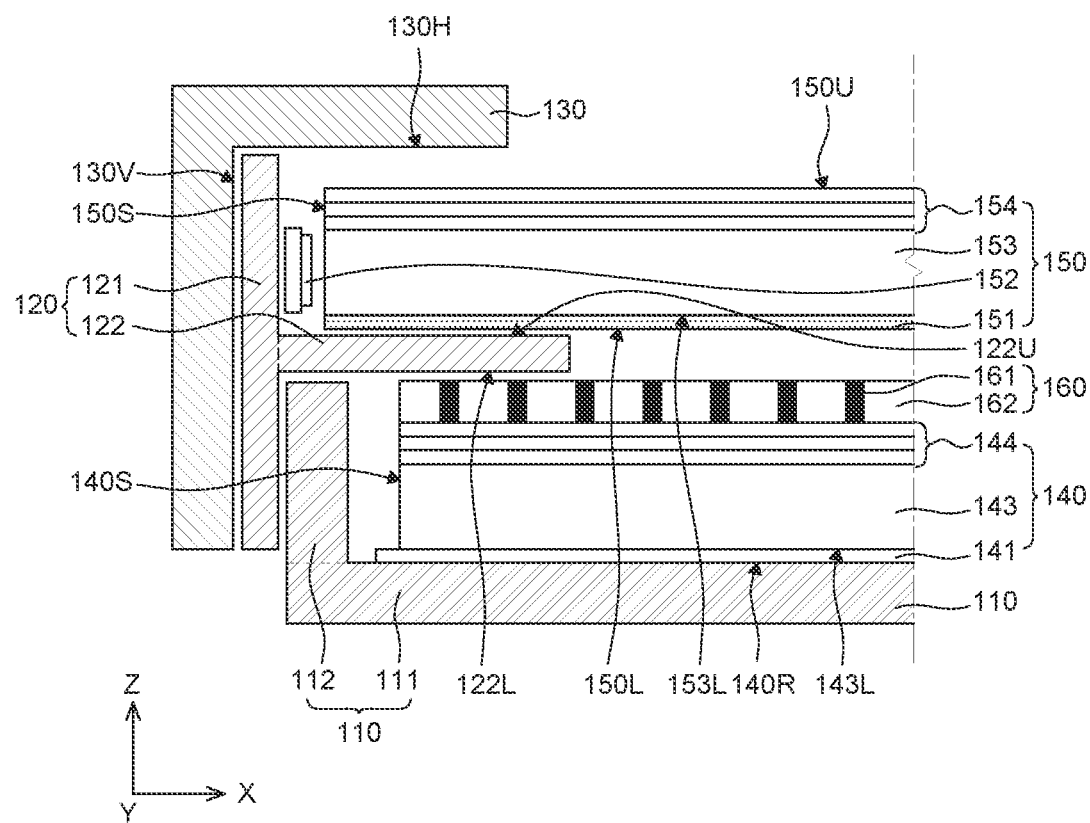
FIG. 2A is a schematic cross-sectional view of the liquid crystal display device of FIG. 1 along line A-A in FIG. 1.

FIG. 1 is a schematic exploded perspective view for explaining a liquid crystal display device 100 according to one or more embodiments of the present disclosure. FIG. 2A is a schematic cross-sectional view of the liquid crystal display device 100 of FIG. 1 in the assembled configuration along line A-A in FIG. 1.

Referring to FIGS. 1 and 2, the liquid crystal display device 100 according to one or more embodiments of the present disclosure includes a bottom cover 110, a first guide frame 120, a second guide frame 130, a first backlight assembly 140 (which may also be referred to herein as a first backlight 140 or a first backlight unit 140), a second backlight assembly 150 (which may also be referred to herein as a second backlight or a second backlight unit 150), a viewing angle control assembly 160 (which may also be referred to herein as a viewing angle control unit 160), and a liquid crystal display panel 170.

The liquid crystal display panel 170 displays an image to a user by adjusting light transmittance of liquid crystals. The liquid crystal display panel 170 includes an upper substrate and a lower substrate facing each other, and a liquid crystal layer including liquid crystal molecules disposed between the upper substrate and the lower substrate.

A plurality of gate lines and a plurality of data lines intersect to define pixels on the lower substrate of the liquid crystal display panel 170, and thin film transistors are provided at intersections of the respective pixels and are connected to pixel electrodes formed in the respective pixels.

A common electrode controls the liquid crystal by forming electric fields with the pixel electrode. According to a liquid crystal alignment control method of the liquid crystal layer, the common electrode is formed on the lower substrate or the upper substrate. For example, when liquid crystals are controlled in a twisted nematic (TN) mode, a vertical alignment (VA) mode or the like, the common electrode is disposed on the upper substrate, and the pixel electrode and the common electrode form a vertical electric field to control the liquid crystals. The common electrode is disposed on the lower substrate that controls the liquid crystals in a fringe field switching (FFS) mode, an in-plane switching (IPS) mode or the like, and the pixel electrode and the common electrode form a horizontal electric field to control the liquid crystals.

A black matrix for covering color filters, the gate lines, the data lines or the thin film transistors is provided on the upper substrate of the liquid crystal display panel 170. Also, although not illustrated in FIG. 1, polarizers may be disposed on a front surface and a rear surface of the liquid crystal display panel 170.

The liquid crystal layer is disposed between the upper substrate and the lower substrate of the liquid crystal display panel 170. An alignment layer for determining an initial molecular arrangement direction of the liquid crystals may be disposed on each of an upper portion and a lower portion of the liquid crystal layer. In addition, side sealing materials may be formed along edges of the upper substrate and the lower substrate to prevent leakage of the liquid crystal layer of the liquid crystal display panel 170.

A driving unit or driver for driving the liquid crystal display panel 170 is disposed along one side of the liquid crystal display panel 170. The driving unit may include various ICs such as a gate driver IC or a data driver IC and a driving circuit to apply signals to the gate lines and the data lines. In this case, the driving unit is electrically connected to the liquid crystal display panel 170 through a connection member, and the connection member may be a COF (Chip On Film) or TCP (Tape Carrier Package).

Accordingly, in the liquid crystal display panel 170, when the thin film transistor connected to each gate line is turned on by an on/off signal for the thin film transistor transmitted to the gate line, an image signal of the data line is transmitted to the pixel electrode corresponding thereto, and an arrangement of the liquid crystals is changed by a consequent electric field between the pixel electrode and the common electrode, resulting in a difference in transmittance. Various features of the liquid crystal display panel 170 described above are not illustrated to avoid obscuring the concepts of the disclosure. In general, the liquid crystal display panel 170 can be implemented using a variety of technologies and techniques in various embodiments.

The bottom cover 110 is disposed below the liquid crystal display panel 170, the first backlight unit 140, and the second backlight unit 150 and supports components of the liquid crystal display device 100, including the first backlight unit 140. The bottom cover 110 may be formed in a quadrangular frame shape with edges bent vertically to define vertical sidewalls, as explained in more detail below. The bottom cover 110 may define an outermost bottom surface of the liquid crystal display device 100 in some embodiments.

Referring to FIG. 2A, the bottom cover 110 includes a support portion 111 and a vertical portion 112. The support portion 111 is a plate structure or a plate with a shape preferably corresponding to a shape of the first backlight unit 140. The support portion 111 supports a rear surface 140R of the first backlight unit 140. The vertical portion 112 or sidewall 112 extends in an upward direction (Z-axis direction) from ends of the support portion 111 to cover side surfaces 140S of the first backlight unit 140. The vertical portion 112 is disposed along edges of the first backlight unit 140 in some embodiments, meaning the vertical portion 112 surrounds the side surfaces 140S of the first backlight unit 140. Optionally, the vertical portion 112 may further extend in the upward direction (Z-axis direction) to cover side surfaces 150S of the second backlight unit 150, if desirable. The vertical portion 112 may extend vertically from the ends of the support portion 111, but is not limited thereto. In general, the vertical portion 112 may be positioned at a selected location on the support portion 111 and in some embodiments, may have a different angular orientation relative to the support portion 111 than vertical (i.e., at a selected angle to the Z axis).

The bottom cover 110 may be formed of a metallic material having high rigidity so as to stably support the components of the liquid crystal display device 100 while having high thermal conductivity so as to efficiently dissipate heat generated from operation of the liquid crystal display device 100, such as at least operation of the driving circuit and the first backlight unit 140, to an external environment.

The first guide frame 120 protects the first backlight unit 140 and the second backlight unit 150 at the side surfaces 140S, 150S of the first backlight unit 140 and the second backlight unit 150, and supports the second backlight unit 150 on a lower or bottom surface 150L of the second backlight unit 150. Specifically, the first guide frame 120 may have a quadrangular frame shape to support edges of the lower surface 150L of the second backlight unit 150 and surround the edges of the first backlight unit 140. The first guide frame 120 includes a base portion 121 surrounding side portions or side surfaces 150S of the second backlight unit 150 and a protrusion or extension portion 122 protruding and extending from the base portion 121 and disposed under the second backlight unit 150. In an embodiment, the base portion 121 extends in the vertical or Z direction and the protrusion portion 122 extends in a horizontal or X direction.

The base portion 121 surrounds the side portions or side surfaces 150S of the second backlight unit 150 and overlaps and surrounds the vertical portion 112 of the bottom cover 110. FIG. 2A illustrates a structure or configuration in which the base portion 121 of the first guide frame 120 is disposed outside the vertical portion 112 (i.e., further from a center of the liquid crystal display device 100 in the X direction) of the bottom cover 110 to surround the vertical portion 112. In an embodiment, the base portion 121 of the first guide frame 120 is instead disposed inside the vertical portion 112 of the bottom cover 110 so that the vertical portion 112 of the bottom cover 110 overlaps and surrounds the base portion 121. In such a non-limiting example, the base portion 121 may surround the side surfaces of the first backlight unit 140. In addition, the base portion 121 is overlapped by, and surrounded by, the second guide frame 130 in some embodiments. The second guide frame 130 may be positioned outside of the first guide frame (i.e., relative to a center of the liquid crystal display device 100 in the X direction) with a vertical portion of the second guide frame 130 generally having a similar length as the base portion 121 of the first guide frame 120. More details of the second guide frame 130 are provided below. Meanwhile, the base portion 121 may be fastened to the bottom cover 110 and the second guide frame 130, so that the bottom cover 110, the first guide frame 120, and the second guide frame 130 may be integrally modularized and connected to each other to support aspects of the liquid crystal display device 100.

The protrusion portion 122 of the first guide frame 120 supports the second backlight unit 150 on a lower portion of the second backlight unit 150 proximate the lower surface 150L of the second backlight unit 150. The protrusion portion 122 protrudes from the base portion 121. Specifically, the protrusion portion 122 protrudes from the base portion 121 between the first and second backlight units 140, 150 and parallel to the first and second backlight units 140, 150. That is, the second backlight unit 150 may be disposed on an upper surface 122U of the protrusion portion 122, and the first backlight unit 140 may be disposed under a lower or bottom surface 122L of the protrusion portion 122.

The second guide frame 130 protects the second backlight unit 150 at the side surfaces 150S of the second backlight unit 150. Also, the second guide frame 130 may support the liquid crystal display panel 170 on a lower or bottom surface 170L of the liquid crystal display panel 170 (FIG. 1). Specifically, the second guide frame 130 may have a quadrangular frame shape to support edges of the lower surface 170L of the liquid crystal display panel 170 and surround edges of the second backlight unit 150 disposed thereunder. The second guide frame 130 may be disposed to cover edges of an upper or top surface 150U of the second backlight unit 150 and the side portions of the second backlight unit 150 covered by the first guide frame 120. That is, the second guide frame 130 includes a horizontal surface 130H covering the edges of the upper surface 150U of the second backlight unit 150 and vertical surfaces 130V covering the base portion 121 of the first guide frame 120, as described above.

FIG. 2A illustrates a structure in which the vertical surfaces 130V of the second guide frame 130 extend in a downward direction and are disposed outside the base portion 121 of the first guide frame 120 (i.e., relative to a center of the liquid crystal display device 100 in the X direction) to surround the base portion 121 of the first guide frame 120. However, the vertical surfaces 130V may also extend in the upward direction to surround side surfaces 170S (FIG. 1) of the liquid crystal display panel 170 positioned thereabove. In an embodiment, the horizontal surface 130H may protrude from the vertical surface 130V to be horizontal with the liquid crystal display panel 170 between the liquid crystal display panel 170 and the second backlight unit 150. That is, the liquid crystal display panel 170 may be disposed on an upper surface of the second guide frame 130, such as an upper horizontal surface 130H, and the second backlight unit 150 may be disposed under a lower surface of the second guide frame 130, such as a lower horizontal surface 130H.

When assembled, the bottom cover 110, the first guide frame 120, and the second guide frame 130 may define a cover assembly that supports and accommodates the first backlight unit 140 and the second backlight unit 150. Each of the bottom cover 110, the first guide frame 120, and the second guide frame 130 may be fastened to one another. In addition, at least two components of the bottom cover 110, the first guide frame 120, and the second guide frame 130 may be connected to each other to form one structure. For example, the bottom cover 110 and the first guide frame 120 may be integrally formed as a single, unitary component. In such a non-limiting example, the vertical portion 112 of the bottom cover 110 and the base portion 121 of the first guide frame 120 may be connected and integrally formed. In addition, the base portion 121 of the first guide frame 120 and the vertical surfaces 130V of the second guide frame 130 may be connected and integrally formed as a single, unitary component. In such a non-limiting example, the second guide frame 130 may be omitted, and on the base portion 121 of the first guide frame 120, an upper surface extending in parallel to the liquid crystal display panel 170 may be provided, similar to horizontal surface 130H, to cover the edges of the second backlight unit 150.

The liquid crystal display device 100 according to an embodiment of the present disclosure includes the first backlight unit 140 and the second backlight unit 150.

With continuing reference to FIG. 1 and FIG. 2A, the first backlight unit 140 supplies light to the liquid crystal display panel 170. The first backlight unit 140 includes a reflective layer 141, a plurality of first light sources 142, a first light guide plate 143, and first optical sheets 144. In FIG. 2A, the first backlight unit 140 is an edge-type backlight unit, and the plurality of first light sources 142 are disposed on a side surface 143S of the first light guide plate 143. However, the present disclosure is not limited thereto, and the first backlight unit 140 may be configured in a direct type. In such a non-limiting example, the plurality of first light sources 142 may be disposed below the first light guide plate 143 and positioned on the bottom cover 110.

The first light sources 142 radiate light to the first light guide plate 143. The first light sources 142 may be implemented as light emitting diodes having advantages such as high efficiency, high brightness, and low power consumption, but the present disclosure is not limited thereto. In addition, the first light sources 142 are turned on and off by receiving an electrical signal from a first light source driver through a first light source printed circuit board. The printed circuit board may be disposed in the rear of, or on, circumferential portions of the first light sources 142. A plurality of the first light sources 142 may be disposed on the bottom cover 110, and locations and arrangement density thereof may be appropriately selected in consideration of optical characteristics thereof as well as the desirable properties of the first back light unit 140 generally. In FIG. 1, the first light sources 142 may be located on the side surface 143S of the first light guide plate 143 and disposed on, and coupled to, the vertical portion 112 of the bottom cover 110, but the present disclosure is not limited thereto. As another non-limiting example, the first light sources 142 may be located under the first light guide plate 143, such that the plurality of first light sources 142 may be disposed on an upper surface of the support portion 111 of the bottom cover 110.

The first light guide plate 143 converts a traveling direction of light incident from the first light source 142 and supplies uniform surface light to the liquid crystal display panel 170. For example, light incident from the first light sources 142 disposed on the side surface 143S of the first light guide plate 143 spreads evenly as it travels inside the first light guide plate 143 through total reflection, so that the first light guide plate 143 may supply uniform surface light in at least a direction generally toward the liquid crystal display panel 170. The first light guide plate 143 may be formed of a glass material or a light-transmissive resin such as polymethyl methacrylate or polycarbonate, among others.

The reflective layer 141 may be disposed below the first light guide plate 143. The reflective layer 141 improves efficiency of light incident to the liquid crystal display panel 170. Light emitted toward or through a lower surface 143L of the first light guide plate 143 may be reflected in the upward direction (i.e., the Z direction) by the reflective layer 141. Accordingly, loss of light emitted from the first light sources 142 through the lower surface 143L can be minimized. The reflective layer 141 may include a metal material having a high reflectance, such as aluminum (Al) and silver (Ag), but is not limited thereto.

The first optical sheets 144 diffuse or condense light that has passed through the first light sources 142 and the first light guide plate 143 so that uniform surface light is emitted toward the second backlight unit 150. For example, the first optical sheets 144 may include a diffusion sheet and a light collection sheet on the diffusion sheet in consecutive order, but the present disclosure is not limited thereto.

The second backlight unit 150 is disposed on the first backlight unit 140. The second backlight unit 150 supplies light to the liquid crystal display panel 170. The second backlight unit 150 includes a plurality of second light sources 152, a second light guide plate 153, and second optical sheets 154. The second backlight unit 150 may be an edge-type backlight unit in which a plurality of the second light sources 152 are disposed on a side surface 153S of the second light guide plate 153. Light emitted from the first backlight unit 140 passes through the second backlight unit 150 located thereabove. Thus, when the second light sources 152 of the second backlight unit 150 are located on a rear surface 153R of the second light guide plate 153, the light emitted from the first backlight unit 140 may be lost. Therefore, unlike the first backlight unit 140, it is preferable to locate the second light sources 152 on the side surface 150S of the second backlight unit 150, and on the side surface 153S of the second light guide plate 153 in some embodiments. Accordingly, the second light sources 152 are located on the side surface 153S of the second light guide plate 153 and are disposed on the base portion 121 of the first guide frame 120.

Since contents of the second light sources 152, the second light guide plate 153, and the second optical sheets 154 constituting the second backlight unit 150 are substantially identical to contents of the first light sources 142, the first light guide plate 143, and the first optical sheets 144 of the first backlight unit 140 in some embodiments, duplicate descriptions will be omitted.

An anti-condensation layer 151 is disposed under the second light guide plate 153 of the second backlight unit 150. The anti-condensation layer 151 suppresses or reduces the likelihood of condensation or water formation on a lower portion of the second light guide plate 153 of the second backlight unit 150 that is caused by moisture penetrating between the first backlight unit 140 and the second backlight unit 150 from the outside or by heat between the first backlight unit 140 and the second backlight unit 150. Additional details of the anti-condensation layer 151 will be described below.

The viewing angle control unit 160 is disposed between the first backlight unit 140 and the second backlight unit 150. The viewing angle control unit 160 may be positioned between the first optical sheets 144 of the first backlight unit 140 and the second light guide plate 153 of the second backlight unit 150 in some embodiments. In a non-limiting example, the first optical sheets 144 of the first backlight unit, the viewing angle control unit 160, and the anti-condensation layer 151 may be provided in consecutive order from bottom to top in the Z direction, with the viewing angle control unit 160 spaced from the anti-condensation layer 151 to enable the protrusion portion 122 of the first guide frame 120 to extend between the viewing angle control unit 160 and the anti-condensation layer 151 proximate edges of the viewing angle control unit 160 and the anti-condensation layer 151. The viewing angle control unit 160 may limit a unidirectional viewing angle of the liquid crystal display panel 170 by blocking or absorbing light having an incident angle greater than or equal to a predetermined angle among the light emitted from the first backlight unit 140. For example, the viewing angle control unit 160 may limit a viewing angle of the liquid crystal display panel 170 in an X-axis direction.

The viewing angle control unit 160 includes a lower film (not illustrated), an upper film (not illustrated), and light blocking areas 161 and light transmissive areas 162 positioned between the lower film and the upper film. The light blocking areas 161 are areas that block or absorb light, and are a plurality of light blocking patterns formed of a black dye such as carbon black in some embodiments. The light-transmissive areas 162 are areas that transmit the light emitted from the first backlight unit 140 in the upward direction (i.e., the Z direction), and may be formed of an insulating material having high light transmittance. The light blocking areas 161 and the light-transmissive areas 162 extend and elongate in one direction and are alternately formed in the other direction. For example, the light blocking areas 161 elongate in a Y-axis direction, and the light blocking areas 161 and light-transmissive areas 162 are alternately arranged (i.e., arranged in an alternating pattern) in the X-axis direction across the viewing angle control unit 160. so that the viewing angle control unit 160 may limit a viewing angle in the X-axis direction. Many other configurations are possible in order to limit the viewing angle in any axis, if desired. For example, it may be desirable to provide the light blocking areas 161 and light transmissive areas 162 alternately arranged in both the X-axis direction and Y-axis direction, similar to a checkerboard pattern, in order to limit the viewing angle in both the X-axis and Y-axis for additional security and privacy according to the concepts of the disclosure. Thus, the present disclosure is not limited to limiting the viewing angle in only the X-axis or in only a single axis, with the X-axis direction provided merely as a non-limiting example to illustrate the concepts of the disclosure. Among light incident from a lower surface of the viewing angle control unit 160, light having an incident angle greater than or equal to a predetermined angle is absorbed or blocked by the light blocking areas 161 that are repeatedly formed and does not pass through the light-transmissive areas 162 and thus through the viewing angle control unit 160. Accordingly, when the first backlight unit 140 operates to emit light, light transmittance is significantly reduced at a viewing angle greater than or equal to a predetermined angle by the viewing angle control unit 160, so that a security mode, that is, a narrow viewing angle mode, can be implemented and a user's privacy protection can be achieved.

In FIG. 2A, the viewing angle control unit 160 is illustrated as a viewing angle control film in which the light blocking areas 161 and light-transmissive areas 162 are repeated. However, the present disclosure is not limited thereto, and any element can also be selectively used, as long as it can provide a narrow viewing angle by absorbing or blocking light having an angle greater than or equal to a specific angle. For example, the viewing angle control unit 160 may be a switchable viewing angle control element using a polymer dispersed liquid crystal (PDLC), a polymer network liquid crystal (PNLC), or the like, and may be a viewing angle control element using an electrochromic material or a lens, including without limitation, an electrically actuatable lens.

The liquid crystal display device 100 according to one or more embodiments of the present disclosure may provide a security mode and a sharing mode by selectively adjusting a viewing angle.

For example, a security mode providing a narrow viewing angle so that a displayed image can be viewed only by a specific user may be implemented by operating the first backlight unit 140 and not operating the second backlight unit 150. Specifically, among the light emitted from the first backlight unit 140, light having an incident angle equal to or greater than a predetermined angle is blocked or absorbed by the viewing angle control unit 160, and light having an incident angle of less than the predetermined angle, that is, only light having a limited viewing angle, may be emitted in the upward direction (i.e., Z-axis direction). The light having a limited viewing angle, that has passed through the viewing angle control unit 160, passes through the second backlight unit 150 in which the second light sources 152 are not operated, and is incident onto the liquid crystal display panel 170. Accordingly, by the viewing angle control unit 160, only light having a limited viewing angle may be recognized by a user.

Next, the sharing mode providing a wide viewing angle so that a displayed image can be viewed not only by a user but also by other people around the user, may be implemented by operating only the second backlight unit 150 or operating both the first backlight unit 140 and the second backlight unit 150. The viewing angle of the light emitted from the first backlight unit 140 is limited by the viewing angle control unit 160, but a viewing angle of light emitted from the second backlight unit 150 is not limited and may be incident on the liquid crystal display panel 170. Thus, viewing angle limiting effects by the viewing angle control unit 160 is not implemented, and a screen can be perceived at a wide viewing angle. The security mode and sharing mode are described in more detail with reference to FIG. 2B and FIG. 2C.

Figure 2B:
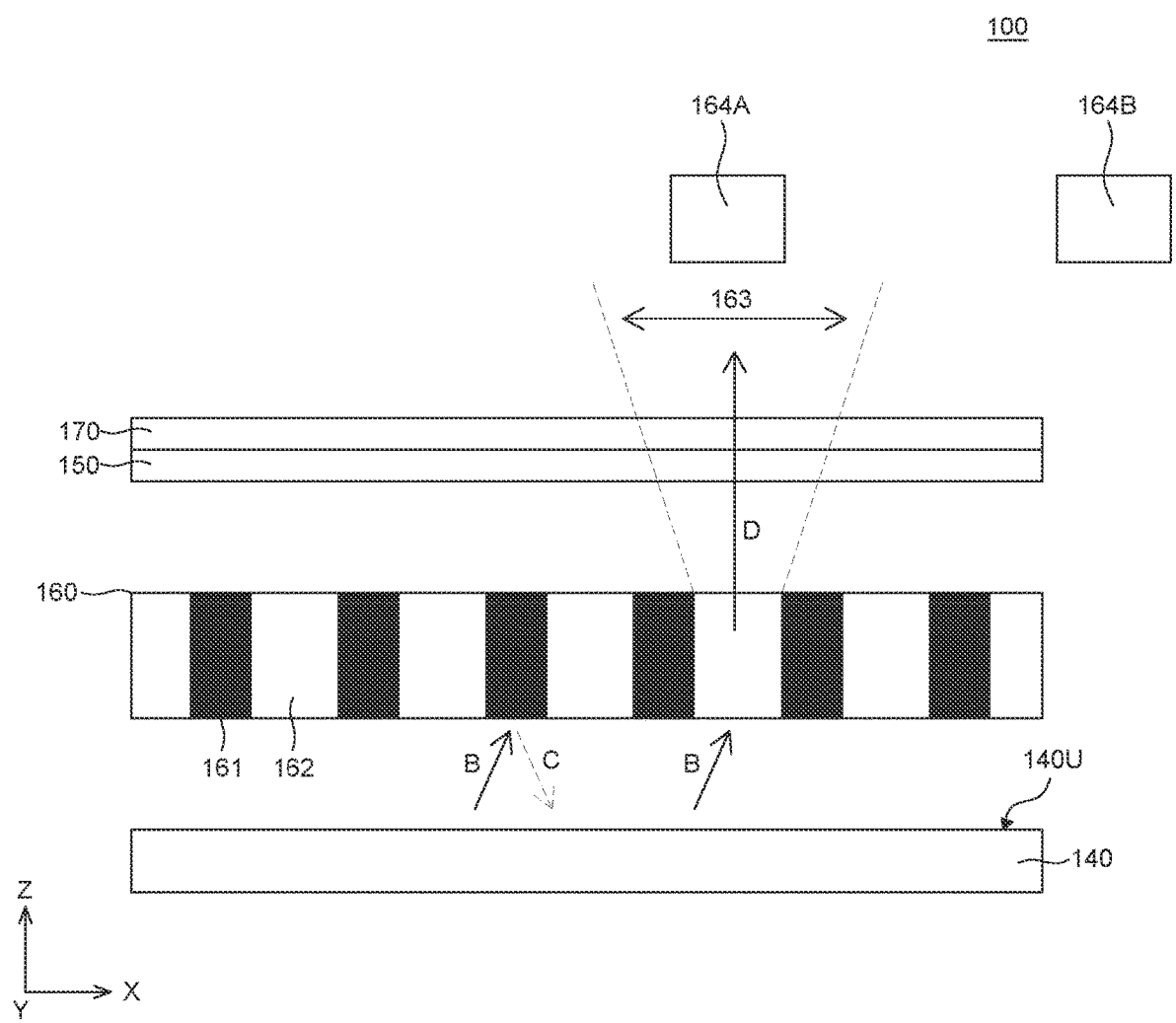
FIG. 2B is a schematic elevational view of the liquid crystal display device of FIG. 2A in a security mode.

FIG. 2B is a schematic elevational view of the security mode, and more specifically, illustrates the first backlight unit 140, the viewing angle control unit 160, the second backlight unit 150, and the liquid crystal display panel 170 in the security mode. As noted above, the first backlight unit 140 is operable to output light from an upper surface 140U of the first backlight unit 140 and toward the viewing angle control unit 160, as represented schematically in FIG. 2B by arrows B. The viewing angle control unit 160 includes the light blocking areas 161 and the light-transmissive areas 162 described above. When light from the first backlight unit 140 impinges on the light blocking areas 161, the light is blocked or absorbed, as represented by dashed arrow C. In other words, the dashed arrow C represents light from the first backlight unit 140 that is not transmitted through the viewing angle control unit 160 because of light blocking areas 161. On the other hand, light that impinges on the light-transmissive areas 162 is transmitted through the transmissive areas 162 and output from the viewing angle control unit 160, as represented by arrow D. The light corresponding to arrow D then passes through the second backlight unit 150, which is preferably not operational in the security mode, and is incident onto the liquid crystal display panel 170. The light or amount of light that is emitted from the viewing angle control unit 160 disperses to be incident on the liquid crystal display panel 170 at a viewing angle 163 that is based on a number of factors, including without limitation, a width of the light blocking areas 161 and/or the light-transmissive areas 162 in the X direction, a height or depth of the light blocking areas 161 and/or the light-transmissive areas 162 in the Z direction, a length of the light blocking areas 161 or the transmissive areas 162 in the Y direction, and the intensity of the light or amount of light output by the first backlight unit 140. These factors, among others, can be balanced to define or select the viewing angle 163 of light output from the viewing angle control unit 160 that is provided to the liquid crystal display panel 170 to display images within the viewing angle 163.

The viewing angle 163 corresponds to the "predetermined angle" mentioned above and represents a range of orientations of a user with respect to the liquid crystal display device 100 that enable the user to view images displayed on the liquid crystal display panel 170. In other words, users that are positioned within the viewing angle 163, such as a user positioned at location 164A relative to the liquid crystal display panel 170, are able to view images, while users that are outside of the viewing angle 163, such as user positioned at 164B relative to the liquid crystal display panel 170, are not able to view images on the liquid crystal display panel 170 because light is not output at an angle from the viewing angle control unit 160 that is discernible by user at location 164B. As should be apparent from the above, the viewing angle 163 can be a wide range of selected angles based on various factors. In some non-limiting examples, the viewing angle 163 may be any angle between 10 degrees and 170 degrees, more preferably between 10 degrees and 120 degrees, more preferably between 10 degrees and 90 degrees, more preferably between 10 and 70 degrees, and most preferably between 10 degrees and 60 degrees or less relative to a horizontal plane defined by an outermost surface of the liquid crystal display panel 170. The above ranges of angles for the viewing angle 163 are inclusive of all intervening values to one decimal place and inclusive of all limit values. In some examples, the viewing angle 163 can even be less than 10 degrees at the lower limit. As a result, and as further described below, the viewing angle control unit 160 can limit users or viewers on sides (i.e., outside the viewing angle 163, such as a user at location 164B) of the liquid crystal display device 100 in the X direction from viewing images on the liquid crystal display panel 170. This can have many benefits, including without limitation, privacy for the primary user as well as the avoidance of distractions in certain environments, such as in a vehicle.

Figure 2C:
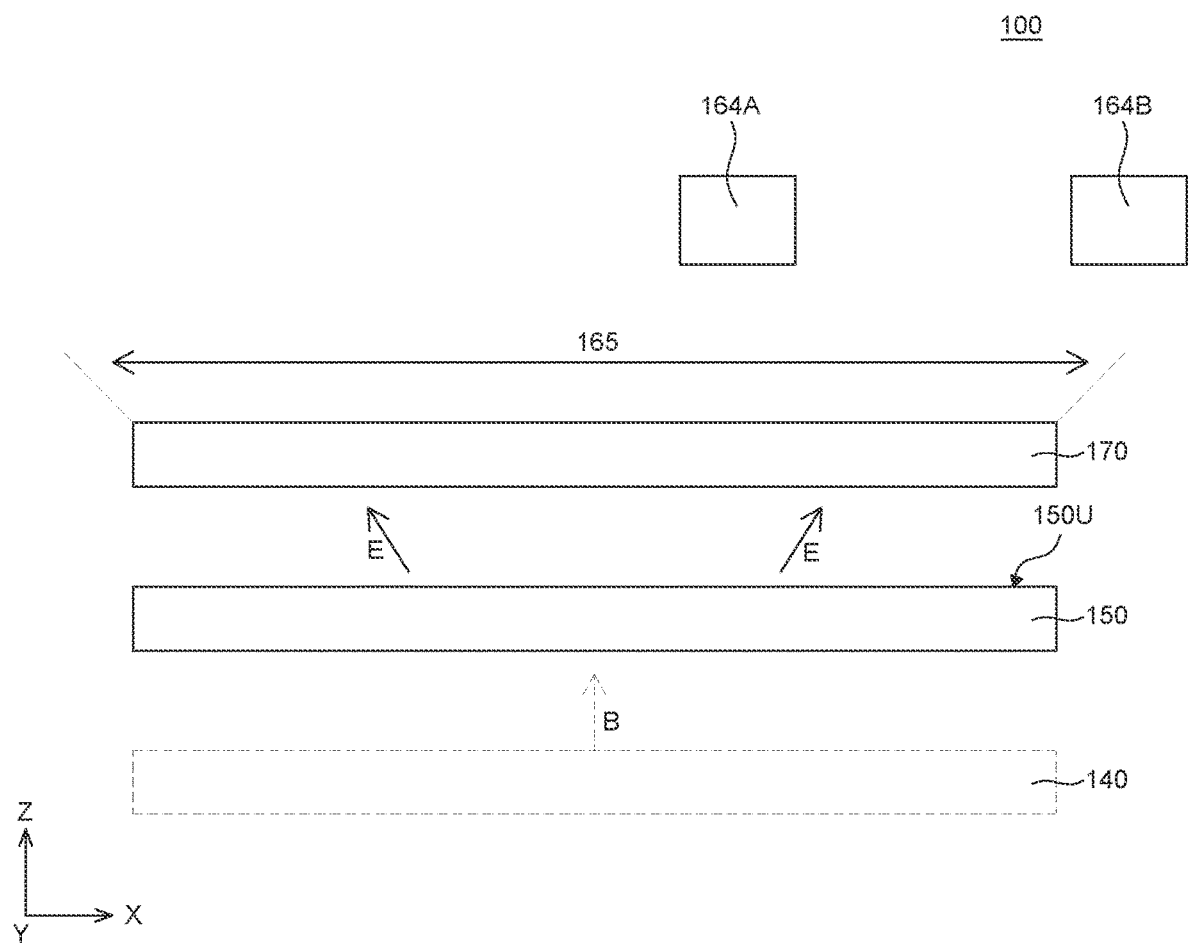
FIG. 2C is a schematic elevational view of the liquid crystal display device of FIG. 2A in a sharing mode.

FIG. 2C is a schematic elevational view of the sharing mode, and more specifically, illustrates the first backlight unit 140, the second backlight unit 150, and the liquid crystal display panel 170 in the sharing mode. As noted above, in the sharing mode, only the second backlight unit 150 may be operated in some embodiments, or the first backlight unit 140 may also optionally be operated. Accordingly, the first backlight unit 140 and arrow B representing light output from the first backlight unit 140 are illustrated in FIG. 2C in dashed lines to demonstrate the optional operation of the first backlight unit 140 in the sharing mode. In the sharing mode, at least the second backlight unit 150 is operated to output light represented by arrows E from the upper or top surface 150U of the second backlight unit 150. Because the second backlight unit 150 is not associated with a viewing angle control unit 160 in some embodiments (i.e., the viewing angle control unit 160 is below the second backlight unit 150), all of the light E output from the second backlight unit 150 may be incident on the liquid crystal display panel 170. In such a non-limiting example, the liquid crystal display panel 170 will display images at a wide viewing angle 165 that is not limited in the X direction. Thus, the wide viewing angle 165 may be up to 178 degrees in some embodiments. As illustrated in FIG. 2C, the wide viewing angle 165 enables users at a wider range of orientations to view images on the liquid crystal display panel 170. In a non-limiting example, users at both locations 164A, 164B can view images on the liquid crystal display panel 170 in the sharing mode, while the user at location 164B is not able to view images on the liquid crystal display panel 170 in the security mode as a result of the viewing angle control unit 160 (see FIG. 2C and associated description above).

Thus, the wide viewing angle 165 in the sharing mode is greater than the viewing angle 163 in the security mode to enable additional users to view images displayed on the liquid crystal display panel 170. While the above non-limiting examples describe the viewing angle control unit 160 as being between the first and second backlight units 140, 150 (i.e., above the first backlight unit 140 and below the second backlight unit 150 in the Z direction) to limit light and thus the viewing angle 163 from the first backlight unit 140, it is contemplated herein that the second backlight unit 150 is also associated with a viewing angle control unit, such as unit 160 or an additional unit 160. Particularly in non-limiting examples where the viewing angle control unit 160 is implemented as an actuatable lens or film (i.e., can be turned "ON" and "OFF"), the viewing angle control unit 160 may instead be associated with the second backlight unit 150. Still further, the display device 100 may include only a single backlight unit (i.e., either first backlight unit 140 or second backlight unit 150) and a corresponding viewing angle control unit 160 in some embodiments.

Returning to FIG. 2A, in the liquid crystal display device 100 according to one or more embodiments of the present disclosure, the anti-condensation layer 151 is disposed on a lower surface 153L of the second light guide plate 153 of the second backlight unit 150. The anti-condensation layer 151 suppresses or reduces the likelihood of a phenomenon in which condensation or water is formed on the lower portion of the second light guide plate 153 of the second backlight unit 150, that is caused by moisture penetrating between the first backlight unit 140 and the second backlight unit 150 from the outside or by heat between the first backlight unit 140 and the second backlight unit 150. The benefits and advantages of the anti-condensation layer 151 on the second light guide plate 153 in the liquid crystal display device 100 according to one or more embodiments of the present disclosure are described in more detail below with reference to FIG. 3A and FIG. 3B.

Figure 3A:
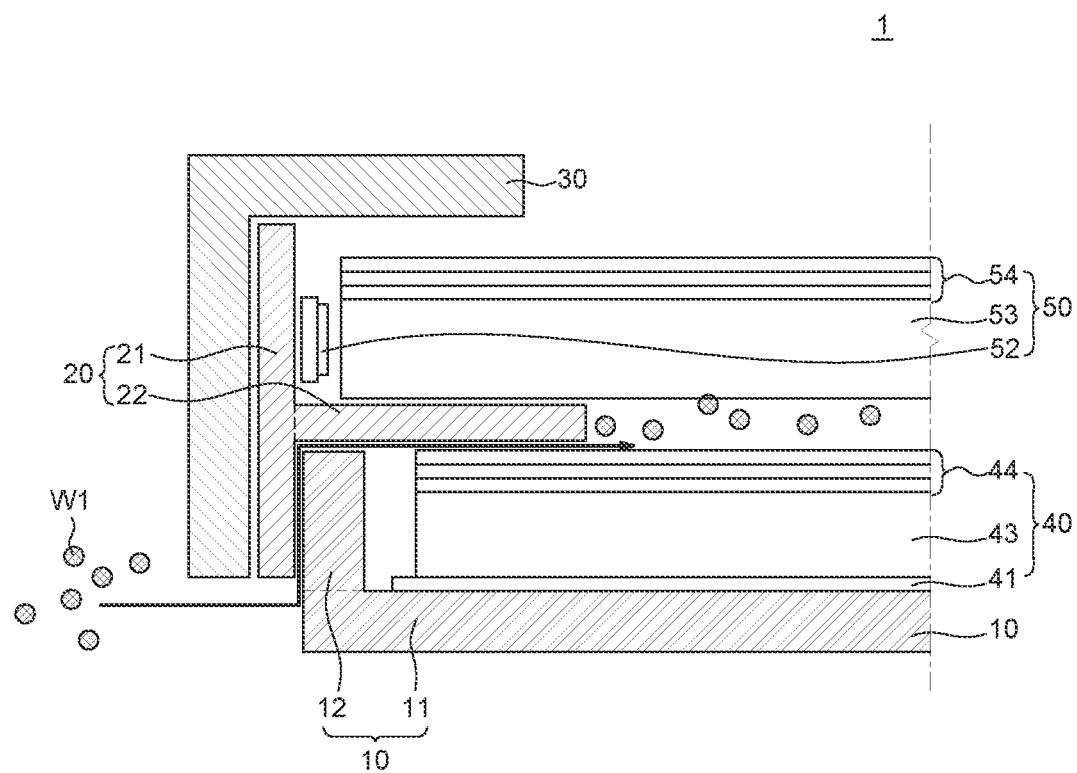
FIGS. 3A and 3B are schematic cross-sectional views of a liquid crystal display device according to a comparative example without an anti-condensation layer.
Figure 3B:
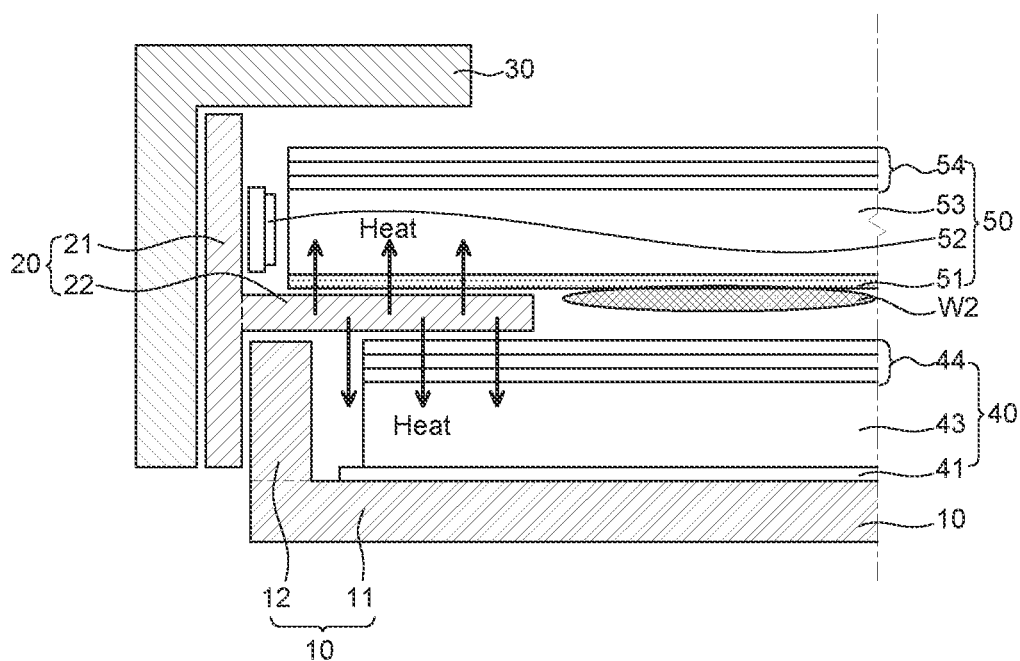

FIGS. 3A and 3B are schematic cross-sectional views of a liquid crystal display device 1 without an anti-condensation layer according to a comparative example.

First, referring to FIG. 3A, when the liquid crystal display device 1 according to the comparative example is exposed to high temperature and high humidity conditions, stains or water due to ambient moisture are formed on a rear surface of a second light guide plate 53. More specifically, moisture W1 existing outside the liquid crystal display device 1 penetrates into the liquid crystal display device 1 and forms on the rear surface of the second light guide plate 53. For example, moisture may penetrate into the liquid crystal display device 1 through a gap in a cover assembly that protects the backlight unit or a space between other structures connected in the assembly of the display device 1.

When the liquid crystal display device 1 operates after moisture penetrates into the liquid crystal display device 1 (i.e., following ingress of moisture W1 in FIG. 3A), condensation W2 may occur on a lower portion of the second light guide plate 53 of a second backlight unit 50 as in FIG. 3B. Specifically, referring to FIG. 3B, when a first backlight unit 40 and the second backlight unit 50 are operated, heat is generated from a first light source and a second light source 52. A temperature of the first backlight unit 40 may increase due to the heat generated from the first light source, and a temperature of the second backlight unit 50 may increase due to the heat generated from the second light source 52. In this case, the heat generated from the second light source 52 is conducted by a first guide frame 20 in contact with the second light source 52. In general, since the first guide frame 20 is formed of metal, the heat may be more rapidly transferred to the first guide frame 20 compared to the second light guide plate 53 that is physically separated therefrom. Consequently, the heat generated from the second light source 52 may further increase the temperature of the first backlight unit 40 as well as the second backlight unit 50. In addition, the heat generated from the second light source 52 may be transferred between the first backlight unit 40 and the second backlight unit 50 through a protrusion portion 22 of the first guide frame 20. As a result, as the liquid crystal display device 1 operates, the temperature of the first backlight unit 40 becomes relatively higher than the temperature of the second backlight unit 50, and air between the first backlight unit 40 and the second backlight unit 50 can be rapidly warmed up. As the temperature between the first backlight unit 40 and the second backlight unit 50 rises, moisture penetrating between the first backlight unit 40 and the second backlight unit 50 is also warmed up, and there occurs a condensation phenomenon in which moisture is condensed on the rear surface of the second light guide plate 53 by the second backlight unit 50 having a relatively low temperature as indicated by condensation W2 in FIG. 3B. As a result, the first backlight unit 40 and the second backlight unit 50 are damaged by moisture generated between the first backlight unit 40 and the second backlight unit 50, or stains or spots are caused by condensation W2 formed on the lower surface of the second light guide plate 53, which may affect the light emitted from the first backlight unit 40, thereby greatly lowering display performance.

However, in the liquid crystal display device 100 illustrated in FIGS. 1 and 2, the anti-condensation layer 151 is disposed under the second light guide plate 153 of the second backlight unit 150. As described above, the anti-condensation layer 151 may suppress condensation occurring between the first backlight unit 140 and the second backlight unit 150 as the liquid crystal display 100 operates.

The anti-condensation layer 151 may be a coating layer formed of a hydrophilic material. The hydrophilic material may be a material having a surface energy of 30 mN/m2 or more or 50 mN/m2 or more and a light transmittance of 80% or more or 90% or more.

The hydrophilic material may be hydrophilic particles or a hydrophilic polymer. For example, the hydrophilic particles may be $SiO_2$ particles or $TiO_2$ particles. In addition, the hydrophilic polymer may be a polymer having at least one hydrophilic functional group selected from the group consisting of a carboxyl group, an aldehyde group, a hydroxyl group, an amine group, and a sulfide group. Specifically, the hydrophilic polymer may be PVA (polyvinyl alcohol), PAA (polyacrylic acid), PC (polycarbonate), PTFE (polytetrafluoroethylene), PSSA-MA (poly styrenesulfonic acid-co-maleic acid), PAM (poly acrylic acid-co-maleic acid), polyethylenimine, poly(sodium 4-styrenesulfonate), poly(allylamine hydrochloride), sodium polyacrylate, poly(4-styrenesulfonic acid), or poly(diallyldimethylammonium chloride). In addition, the hydrophilic polymer may be polysilazane, or derivatives thereof. However, the hydrophilic material is not limited thereto, and the hydrophilic material may be selected from various materials preferably including the surface energy and light transmittance described above.

Meanwhile, the anti-condensation layer 151 may further include a moisture absorbent. For example, the moisture absorbent may include one of a metal oxide, metal salts, or phosphorus pentoxide ($P_2O_5$), or a mixture of two or more of them, as a moisture-reactive adsorbent. The moisture absorbent may include zeolite, zirconia, or montmorillonite as a physical adsorbent. Specific examples of the metal oxide include lithium oxide ($Li_2O$), sodium oxide ($Na_2O$), barium oxide (BaO), calcium oxide (CaO), or magnesium oxide (MgO). Examples of the metal salts may include sulfates such as lithium sulfate ($Li_2SO_4$), sodium sulfate ($Na_2SO_4$), calcium sulfate ($CaSO_4$), magnesium sulfate ($MgSO_4$), cobalt sulfate ($CoSO_4$), gallium sulfate ($Ga_2(SO_4)_3$), titanium sulfate ($Ti(SO_4)_2$), or nickel sulfate ($NiSO_4$); metal halides such as calcium chloride ($CaCl_2$), magnesium chloride ($MgCl_2$), strontium chloride ($SrCl_2$), yttrium chloride ($YC_3$), copper chloride ($CuCl_2$), cesium fluoride (CsF), tantalum fluoride ($TaF_5$), niobium fluoride ($NbF_5$), lithium bromide (LiBr), calcium bromide ($CaBr_2$), cesium bromide ($CeBr_3$), selenium bromide ($SeBr_4$), vanadium bromide ($VBr_3$), magnesium bromide ($MgBr_2$), barium iodide ($BaI_2$) or magnesium iodide ($MgI_2$); or metal chlorates such as barium perchlorate (Ba(ClO4)2) or magnesium perchlorate (Mg(ClO4)2). However, the present disclosure is not limited thereto.

The anti-condensation layer 151 may be coated on the lower or rear surface 153L of the second light guide plate 153 by using a coating method such as spin coating or printing, but the present disclosure is not limited thereto.

The surface energy of the anti-condensation layer 151 may preferably be 30 mN/m2 or more to 50 mN/m2 or more, including all intervening and limit values. When the surface energy of the anti-condensation layer 151 is in the above range, it is difficult for condensation to form between the first backlight unit 140 and the second backlight unit 150 even when the liquid crystal display device 100 is operated in an environment of a high temperature of 40° C. or higher or a high humidity of 90% or higher. Instead, the condensation may be absorbed in embodiments that include a moisture absorbent.

A water contact angle of the anti-condensation layer 151 may be 100 or less or 5° or less. Since the anti-condensation layer 151 is formed by coating a hydrophilic material, it is possible to suppress occurrence of stains or spots on the lower portion of the second backlight unit 150 due to condensation.

A thickness of the anti-condensation layer 151 may be 10 μm to 100 μm. When the thickness of the anti-condensation layer 151 is less than 10 μm, effects of preventing condensation, such as formation of water droplets or stains, may be less advantageous in a high-temperature and high-humidity environment. When the thickness of the anti-condensation layer 151 is greater than 100 μm, light transmittance may decrease, and a path of light emitted from the first backlight unit 140 may be affected, so that an effect of limiting a viewing angle may be reduced.

Recently, liquid crystal display devices have been developed for implementation in various places or environments. In particular, the liquid crystal display devices may selectively limit viewing angles as needed, depending on places where they are used. The liquid crystal display device according to one or more embodiments of the present disclosure may implement a security mode in which a viewing angle is limited by a user's selection and a sharing mode in which a viewing angle is not limited by using two backlight units and a viewing angle control unit. However, according to external environments of the liquid crystal display device, a defect in which moisture penetrates into the liquid crystal display device may occur. In this case, the backlight unit may be damaged by the permeated moisture. In addition, when the liquid crystal display device operates, heat is generated in a first backlight unit and a second backlight unit, and there occurs a condensation phenomenon in which water droplets are formed on a rear surface of a light guide plate constituting the second backlight unit due to a temperature difference between the first backlight unit and the second backlight unit. The condensation phenomenon may cause stains or spots and affect light emitted from the first backlight unit, so that display performance and an effect of limiting a viewing angle can be significantly reduced. Accordingly, in the liquid crystal display device according to embodiments of the present disclosure, an anti-condensation layer coated with a hydrophilic material is formed on the rear surface of the second light guide plate constituting the second backlight unit positioned thereabove. By the hydrophilic material of the anti-condensation layer, the formation of condensation is suppressed and stains or spots do not occur even in a high-temperature and high-humidity environment. By doing so, it is possible to suppress durability and performance degradation of the liquid crystal display device in a high-temperature and high-humidity environment.

Figure 4:
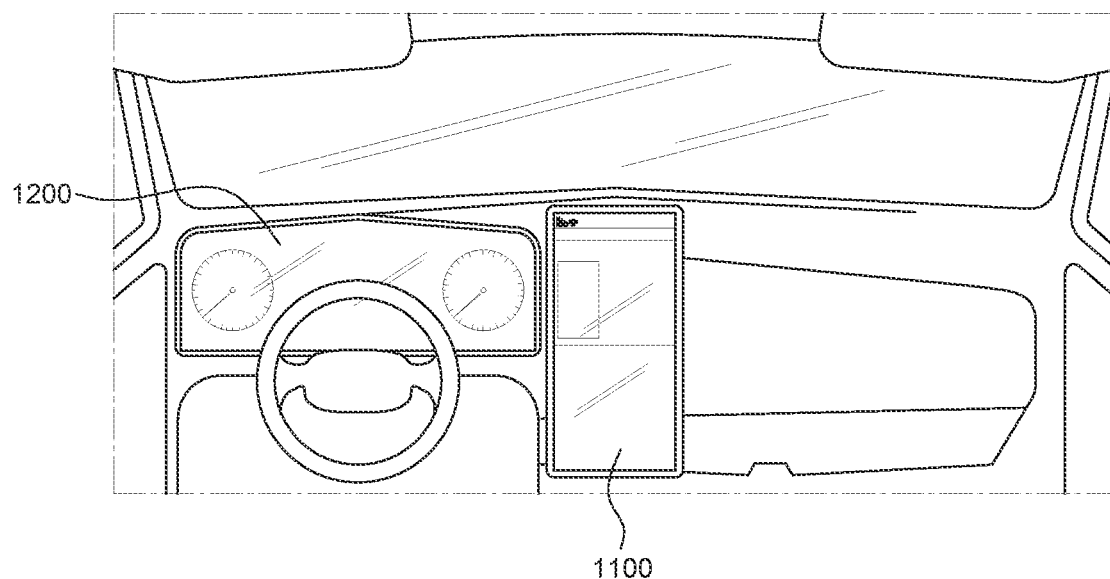
FIG. 4 is a schematic elevational view of an example implementation of the embodiments of a liquid crystal display device according to the present disclosure.

FIG. 4 is a schematic elevational view of an example implementation of embodiments of the liquid crystal display device according to the present disclosure.

Referring to FIG. 4, the liquid crystal display device according to embodiments of the present disclosure may be used for a center fascia 1100 or an instrument panel 1200 of a vehicle 1000, among many other possible implementations, including without limitation, televisions, mobile devices (phones and tablets), computers, and the like. The liquid crystal display device according to embodiments of the present disclosure may selectively limit a viewing angle, as described herein. By doing so, it is possible to reduce distraction of a driver sitting in the driver's seat by limiting the viewing angle while driving the vehicle. For example, in the case of the instrument panel 1200 placed generally in alignment with the driver's seat, the driver may continuously look at the instrument panel 1200 during driving. On the other hand, the center fascia 1100 placed between the driver's seat and a passenger seat and/or a display placed in front of the passenger seat may distract the driver or be intended for use only by the passenger. In such a non-limiting example, the driver's eyes may be distracted by the center fascia 1100 and/or passenger display, which may interfere with safe driving. Therefore, by using the liquid crystal display device according to embodiments of the present disclosure, it is possible to limit distractions during driving by limiting the viewing angle to prevent the driver from viewing the display (i.e., the driver is outside of the viewing angle of the center fascia 1100 and/or the passenger display). Meanwhile, in the case of the display for the vehicle, it is exposed to a variety of ambient environments and can be used in a high temperature or high humidity environment. Accordingly, the liquid crystal display device according to embodiments of the present disclosure may incorporate the anti-condensation layer to suppress a condensation phenomenon or reduce the likelihood of condensation formation occurring between backlight units, so that it is possible to suppress or reduce degradation of display performance and improve durability of the display device.

In view of the above, one or more embodiments of a device may be summarized as including: a display device manipulatable between a security mode and a sharing mode, including a first backlight, a viewing angle control assembly disposed on the first backlight, the viewing angle control assembly including light blocking areas and light transmissive areas, and a display panel disposed on the viewing angle control assembly, wherein in the security mode, the light transmissive areas are configured to transmit light output by the first backlight to the display panel and the light blocking areas are configured to block or absorb the light output by the first backlight to limit a viewing angle of an image displayed on the display panel.

In an embodiment, the light blocking areas and light transmissive areas of the viewing angle control assembly are arranged in an alternating pattern.

In an embodiment, the viewing angle is between and including 10 degrees and 120 degrees.

In an embodiment, the display device further includes: a second backlight disposed on the viewing angle control assembly; and an anti-condensation layer disposed on the second backlight.

In an embodiment, in the sharing mode, the second backlight is operable to output additional light to the display panel to widen the viewing angle of the image displayed on the display panel relative to the security mode.

In an embodiment, the display device further includes: a bottom cover including a support portion and a vertical portion, the first backlight disposed on the support portion of the bottom cover with the vertical portion of the bottom cover surrounding at least a portion of side surfaces of the first backlight; a first guide frame disposed on the bottom cover, the first guide frame including a base portion overlapping the vertical portion of the bottom cover and an extension portion; and a second guide frame disposed on the first guide frame.

In an embodiment, the display device further includes: a second backlight disposed on the first backlight, the extension portion of the first guide frame extending between the first backlight and the second backlight.

One or more embodiments of a display device may be summarized as including: a display panel; a first backlight disposed on the display panel; a second backlight disposed on the first backlight; and an anti-condensation layer disposed on a lower surface of the second backlight.

In an embodiment, the second backlight includes a light guide plate having the lower surface, the anti-condensation layer disposed on the lower surface of the light guide plate of the second backlight.

In an embodiment, the anti-condensation layer is a coating layer of a hydrophilic material on the lower surface of the second backlight, the hydrophilic material having a surface energy between and including 30 mN/m2 to 50 mN/m2.

In an embodiment, the anti-condensation layer has a light transmittance of at least 80%.

In an embodiment, the anti-condensation layer further includes a moisture absorbent.

In an embodiment, the display device further includes: a viewing angle control assembly disposed on the first backlight, the viewing angle control assembly including alternating light blocking areas and light transmissive areas, wherein in a security mode, the light transmissive areas are configured to transmit light output by the first backlight to the display panel and the light blocking areas are configured to block or absorb the light output by the first backlight to limit a viewing angle of an image displayed on the display panel, and wherein in a sharing mode, the second backlight is operable to output additional light to the display panel to widen the viewing angle of the image displayed on the display panel relative to the security mode.

In an embodiment, the display device further includes: a bottom cover including a support portion and a vertical portion, the first backlight disposed on the support portion of the bottom cover; a first guide frame disposed on the bottom cover, the first guide frame including a base portion and an extension portion extending between the first backlight and the second backlight; and a second guide frame disposed on the first guide frame and overlapping the base portion of the first guide frame.

One or more embodiments of a display device may be summarized as including: a bottom cover including a support portion and a vertical portion; a first guide frame disposed on the bottom cover, the first guide frame including a base portion overlapping the vertical portion of the bottom cover and an extension portion; a second guide frame disposed on the first guide frame and overlapping the base portion of the first guide frame; and a display panel disposed on the second guide frame.

In an embodiment, the display device further includes: a first backlight disposed on the support portion of the bottom cover, the vertical portion of the bottom cover at least partially surrounding side surfaces of the first backlight; and a second backlight disposed on the extension portion of the first guide frame, the base portion of the first guide frame at least partially surrounding side surfaces of the second backlight.

In an embodiment, the display device further includes: a first backlight disposed on the bottom cover; a viewing angle control assembly disposed on the first backlight, the viewing angle control assembly including alternating light blocking areas and light transmissive areas; and a second backlight disposed on the first guide frame, wherein in a security mode, the light transmissive areas are configured to transmit light output by the first backlight to the display panel and the light blocking areas are configured to block or absorb the light output by the first backlight to limit a viewing angle of an image displayed on the display panel, and wherein in a sharing mode, the second backlight is operable to output additional light to the display panel to widen the viewing angle of the image displayed on the display panel relative to the security mode.

In an embodiment, the display device further includes: a first backlight disposed on the bottom cover; a second backlight disposed on the first guide frame; and an anti-condensation layer between the first backlight and the second backlight.

In an embodiment, the anti-condensation layer is a coating layer of a hydrophilic material on a lower surface of the second backlight, the hydrophilic material having a surface energy between and including 30 mN/m2 to 50 mN/m2 and a light transmittance of at least 80%.

In an embodiment, the anti-condensation layer further includes a moisture absorbent.

Although the embodiments of the present disclosure have been described in detail with reference to the accompanying drawings, the present disclosure is not limited thereto and may be embodied in many different forms without departing from the technical concept of the present disclosure. Therefore, the embodiments of the present disclosure are provided for illustrative purposes only but not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the claims is not limited by the present disclosure, and all the technical concepts in the disclosure and claims, and equivalent scope thereof, should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a display device manipulatable between a security mode and a sharing mode, including:
a first backlight;
a viewing angle control assembly disposed on the first backlight, the viewing angle control assembly including light blocking areas and light transmissive areas; and
a display panel disposed on the viewing angle control assembly;
a second backlight disposed on the viewing angle control assembly; and
an anti-condensation layer disposed between the first backlight and the second backlight,
wherein in the security mode, the light transmissive areas are configured to transmit light output by the first backlight to the display panel and the light blocking areas are configured to perform at least one of blocking or absorbing the light output by the first backlight to limit a viewing angle of an image displayed on the display panel.

2. The device of claim 1, wherein the light blocking areas and light transmissive areas of the viewing angle control assembly are arranged in an alternating pattern, and
wherein the viewing angle is between and including 10 degrees and 120 degrees.

3. The device of claim 1, wherein in the sharing mode, the second backlight is operable to output additional light to the display panel to widen the viewing angle of the image displayed on the display panel relative to the security mode.

4. The device of claim 1, wherein the display device further includes:
a bottom cover including a support portion and a vertical portion, the first backlight disposed on the support portion of the bottom cover with the vertical portion of the bottom cover surrounding at least a portion of side surfaces of the first backlight;
a first guide frame disposed on the bottom cover, the first guide frame including a base portion overlapping the vertical portion of the bottom cover and an extension portion; and
a second guide frame disposed on the first guide frame.

5. The device of claim 4, wherein the extension portion of the first guide frame extends between the first backlight and the second backlight.

6. The device of claim 4, wherein the anti-condensation layer is between the extension portion of the first guide frame and the second backlight.

7. A display device, comprising:
a display panel;
a first backlight disposed on the display panel;
a second backlight disposed on the first backlight; and
an anti-condensation layer disposed on a lower surface of the second backlight.

8. The display device of claim 7, wherein the second backlight includes a light guide plate having the lower surface, the anti-condensation layer disposed on the lower surface of the light guide plate of the second backlight.

9. The display device of claim 7, wherein the anti-condensation layer is a coating layer of a hydrophilic material on the lower surface of the second backlight, the hydrophilic material having a surface energy over 30 mN/m2.

10. The display device of claim 7, wherein the anti-condensation layer further includes a moisture absorbent.

11. The display device of claim 7, further comprising:
a viewing angle control assembly disposed on the first backlight, the viewing angle control assembly including alternating light blocking areas and light transmissive areas,
wherein in a security mode, the light transmissive areas are configured to transmit light output by the first backlight to the display panel and the light blocking areas are configured to perform at least one of blocking or absorbing the light output by the first backlight to limit a viewing angle of an image displayed on the display panel, and
wherein in a sharing mode, the second backlight is operable to output additional light to the display panel to widen the viewing angle of the image displayed on the display panel relative to the security mode.

12. The display device of claim 7, further comprising:
a bottom cover including a support portion and a vertical portion, the first backlight disposed on the support portion of the bottom cover;
a first guide frame disposed on the bottom cover, the first guide frame including a base portion and an extension portion extending between the first backlight and the second backlight; and
a second guide frame disposed on the first guide frame and overlapping the base portion of the first guide frame.

13. A display device, comprising:
a bottom cover including a support portion and a vertical portion;
a first backlight disposed on the bottom cover;
a first guide frame disposed on the bottom cover, the first guide frame including a base portion overlapping the vertical portion of the bottom cover and an extension portion;
a second backlight disposed on the first guide frame;
a second guide frame disposed on the first guide frame and overlapping the base portion of the first guide frame;
an anti-condensation layer between the first backlight and the second backlight; and
a display panel disposed on the second guide frame.

14. The display device of claim 13, further comprising:
a first backlight disposed on the support portion of the bottom cover, the vertical portion of the bottom cover at least partially surrounding side surfaces of the first backlight; and
a second backlight disposed on the extension portion of the first guide frame, the base portion of the first guide frame at least partially surrounding side surfaces of the second backlight.

15. The display device of claim 13, further comprising:
a first backlight disposed on the bottom cover;
a viewing angle control assembly disposed on the first backlight, the viewing angle control assembly including alternating light blocking areas and light transmissive areas; and
a second backlight disposed on the first guide frame,
wherein in a security mode, the light transmissive areas are configured to transmit light output by the first backlight to the display panel and the light blocking areas are configured to perform at least one of blocking or absorbing the light output by the first backlight to limit a viewing angle of an image displayed on the display panel, and
wherein in a sharing mode, the second backlight is operable to output additional light to the display panel to widen the viewing angle of the image displayed on the display panel relative to the security mode.

16. The display device of claim 13, wherein the anti-condensation layer is a coating layer of a hydrophilic material on a lower surface of the second backlight, the hydrophilic material having a surface energy over 30 mN/m2 and a light transmittance of at least 80%.

17. The display device of claim 16, wherein the anti-condensation layer further includes a moisture absorbent.

\* \* \* \* \*